H. C. PARSONS.
THERMOMETER CASE.
APPLICATION FILED JUNE 4, 1918.

1,302,082.

Patented Apr. 29, 1919.

Witnesses

Inventor
H. C. Parsons
By
Attorneys

UNITED STATES PATENT OFFICE.

HERMAN C. PARSONS, OF MONUMENT, OREGON.

THERMOMETER-CASE.

1,302,082.   Specification of Letters Patent.   Patented Apr. 29, 1919.

Application filed June 4, 1918. Serial No. 238,158.

*To all whom it may concern:*

Be it known that I, HERMAN C. PARSONS, a citizen of the United States, residing at Monument, in the county of Grant, State of Oregon, have invented a new and useful Thermometer-Case; and I do hereby declare the following to be a full, clear, and exact description of the invention, such as will enable others skilled in the art to which it appertains to make and use the same.

This invention relates to an improved thermometer case for securely holding the thermometer therein, and centrally of a conical chamber, spaced from the side walls thereof, whereby an antiseptic solution may be forced upwardly into the chamber for sterilizing the thermometer.

One of the objects of the invention consists in the provision of means movable in the casing and carrying the thermometer in its chamber, whereby as said means is moved downwardly, said antiseptic solution will be forced upwardly into the chamber, and when said means is raised the solution will flow back to the bottom of said casing.

The invention comprises further features and combination of parts as hereinafter set forth shown in the drawings and claimed.

In the drawings:—

Figure 1:
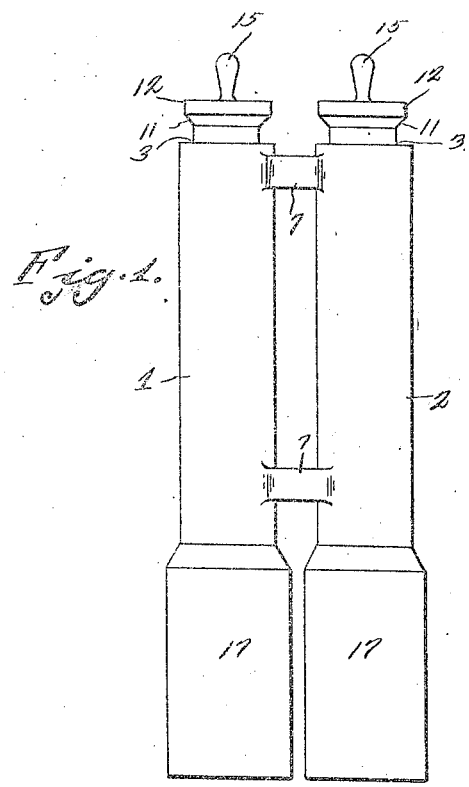
Figure 1 is a view in side elevation of the improved thermometer case constructed in accordance with the invention.
Figure 2:
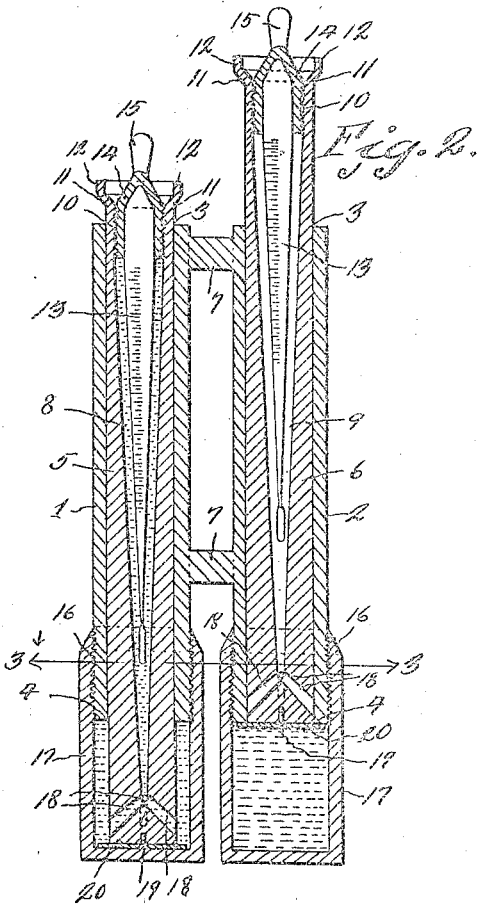
Fig. 2 is a vertical sectional view.
Figure 3:
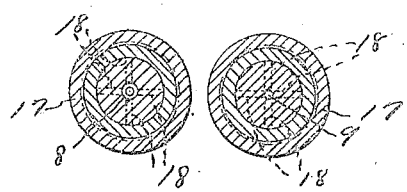
Fig. 3 is a cross sectional view on line 3—3 of Fig. 2.

Referring more especially to the drawings, 1 and 2 designate a pair of tubular casings, each of which is opened at both ends as shown at 3 and 4. By this construction the casings 1 and 2 may receive plunger casings 5 and 6 telescopically therethrough. The casings 1 and 2 are integrally connected by the cross pieces 7. The plunger casings 5 and 6 are provided with conical chambers 8 and 9, the upper ends of which are provided with threads 10. The upper ends of the plunger casings terminate in flanges, which comprise conical parts 11 and cylindrical parts 12. The thermometers 13 are constructed conical, so as to conform to the conical chambers 8 and 9. The upper ends of the thermometers have secured thereto in any suitable manner metallic thimbles 14, which are provided with handles 15. The thimbles are exteriorly threaded, so as to engage the threads 10, and owing to the thicknesses of the thimbles, said thermometers are held in spaced relation but concentrically with the inner walls of the chambers 8 and 9. The flanges at the upper ends of the plunger casings constitute means to guide the thermometers into the chambers 8 and 9. The exterior surface at the lower ends of the casings 1 and 2 are provided with threads 16, which are engaged by the threads of the interior surfaces of the casings 17, which have their lower ends closed. The tapered ends of the chambers 8 and 9 terminate in laterally and downwardly extending ports 18. By reason of the thicknesses of the casings 1 and 2 the lower ends of the plunger casings are spaced concentrically from the inner surfaces of the casings 17, which are designed to receive any suitable antiseptic solutions. For instance one may contain a very strong antiseptic, such as carbolic-acid or the like, while the other may contain a weaker solution for instance such as alcohol or the like. Secured to the lower end of the plunger casings by means of screws 19 are disks 20, which are of diameters larger than the plungers so as to overlie the lower ends of the casings 1 and 2, and limit the plunger casings in their upward movements. It is to be noted that when the plunger casings are moved downwardly, the antiseptic solution in the casings 17 will be displaced and forced upwardly through the ports 18 into the chambers 8 and 9, in order to sterilize the thermometers. When the plunger casings are raised, the solution will pass out through the ports 18 and back into the casings 17. When the plunger casings are raised the ports 18 will be closed by their lower ends being covered by the inner surface of the casings 1 and 2. As shown in Fig. 2 one of the plunger casings is raised, the thermometer having been sterilized, so that by the time the physician reaches a patient, the remaining solution on the thermometer has evaporated and the thermometer is ready for use. After its use it may be lowered, by moving the plunger casing 6 downwardly, and the other plunger casing 5 is raised, so that its thermometer will be ready for use by the time the physician reaches his next patient.

The invention having been set forth what is claimed as new and useful is:—

1. The combination with a casing for containing an antiseptic solution, of a plunger casing having a conical chamber for the reception of a thermometer and being telescopically movable in the first casing, the lower end of the plunger casing having ports, through which the antiseptic solution may be forced into the thermometer chamber, when the plunger is moved downwardly and allowed to flow back into the casing, when the plunger is moved upwardly.

2. The combination with a casing for containing an antiseptic solution, of a plunger casing having a conical chamber for the reception of a thermometer and being telescopically movable in the first casing, the lower end of the plunger casing having ports, through which the antiseptic solution may be forced therethrough into the thermometer chamber, when the plunger is moved downwardly, and allowed to return to the casing, when the plunger is moved upwardly, and means carried by the lower end of the plunger casing for limiting the upward movement of the plunger casing.

3. The combination with a casing for containing an antiseptic solution, of a plunger casing having a conical thermometer chamber, a thermometer having means on one end for engagement with the wall of the thermometer chamber for holding the thermometer in its chamber, said first casing comprising an upper tubular section and a bottom tubular section having its lower end closed, said sections being detachably united, one within the other, said upper tubular section acting as a guide for the plunger casing, the lower end of the thermometer chamber terminating in lateral ports, through which the solution may be forced into the thermometer chamber, when the plunger is moved downwardly, and allowed to return into the lower section of the casing, when the plunger is moved upwardly and a disk carried by the lower end of the plunger casing to contact with the lower end of the tubular section to limit the plunger casing in its upward movement.

In testimony whereof I have signed my name to this specification in the presence of two subscribing witnesses.

HERMAN C. PARSONS.

Witnesses:
F. W. CUPPER,
J. J. LIMAS.